US010870984B2

(12) United States Patent
Snider et al.

(10) Patent No.: US 10,870,984 B2
(45) Date of Patent: Dec. 22, 2020

(54) SPRAY FOAMS CONTAINING NON-HALOGENATED FIRE RETARDANTS

(71) Applicant: JOHNS MANVILLE, Denver, CO (US)

(72) Inventors: Scott Snider, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 240 days.

(21) Appl. No.: 15/730,485

(22) Filed: Oct. 11, 2017

(65) Prior Publication Data

US 2018/0030245 A1 Feb. 1, 2018

Related U.S. Application Data

(62) Division of application No. 14/750,397, filed on Jun. 25, 2015, now Pat. No. 9,815,966.

(60) Provisional application No. 62/026,122, filed on Jul. 18, 2014.

(51) Int. Cl.

| C08G 18/54 | (2006.01) |
|---|---|
| E04B 1/94 | (2006.01) |
| C08J 9/00 | (2006.01) |
| C08J 9/14 | (2006.01) |
| C08G 18/09 | (2006.01) |
| C08G 18/16 | (2006.01) |
| C08G 18/38 | (2006.01) |
| C08G 18/40 | (2006.01) |
| C08G 18/42 | (2006.01) |
| C08G 18/48 | (2006.01) |
| E04B 1/76 | (2006.01) |
| C08G 101/00 | (2006.01) |

(52) U.S. Cl.
CPC ............ *E04B 1/941* (2013.01); *C08G 18/092* (2013.01); *C08G 18/163* (2013.01); *C08G 18/3878* (2013.01); *C08G 18/4027* (2013.01); *C08G 18/42* (2013.01); *C08G 18/4804* (2013.01); *C08G 18/546* (2013.01); *C08J 9/0019* (2013.01); *C08J 9/0023* (2013.01); *C08J 9/0038* (2013.01); *C08J 9/141* (2013.01); *C08J 9/146* (2013.01); *E04B 1/7604* (2013.01); *E04B 1/94* (2013.01); *C08G 2101/00* (2013.01); *C08G 2101/0041* (2013.01); *C08G 2105/02* (2013.01); *C08J 2201/022* (2013.01); *C08J 2205/05* (2013.01); *C08J 2205/052* (2013.01); *C08J 2207/04* (2013.01); *C08J 2375/04* (2013.01)

(58) Field of Classification Search
CPC ............... C08G 18/092; C08G 18/163; C08G 18/3878; C08G 18/4027; C08G 18/42; C08G 18/4804; C08G 2101/00; C08G 2101/0041; C08G 2101/005; C08G 18/546; C08G 2101/0058; C08G 2105/02; C08J 9/0019; C08J 9/0023; C08J 9/0038; C08J 9/141; C08J 9/146; C08J 2201/022; C08J 2205/05; C08J 2201/052; C08J 2207/04; C08J 2375/04; C08K 5/5333; E04B 1/7604; E04B 1/94; E04B 1/941
See application file for complete search history.

(56) References Cited

U.S. PATENT DOCUMENTS

| 2,579,810 A | 12/1951 | Fields |
| 2,593,213 A | 4/1952 | Stiles |
| 3,102,900 A | 9/1963 | Fields |
| 3,179,522 A | 4/1965 | Temin |
| 3,382,301 A | 5/1968 | Hechenbleikneret et al. |
| 3,385,801 A | 5/1968 | Monsanto |
| 3,609,107 A | 9/1971 | Boyer et al. |
| 3,746,572 A | 7/1973 | Weil |
| 3,956,202 A * | 5/1976 | Iwasaki .................. C08J 9/0061 521/109.1 |
| 3,969,437 A | 7/1976 | Shim |
| 4,024,207 A | 5/1977 | Biehler et al. |
| 4,237,182 A * | 12/1980 | Fulmer .................... C09D 5/18 169/64 |
| 4,458,034 A * | 7/1984 | Fracalossi .......... C08G 18/6484 521/107 |
| 4,520,139 A * | 5/1985 | Kennedy ............ C08G 18/6484 106/162.9 |
| 4,654,375 A * | 3/1987 | Malwitz ............. C08G 18/6511 106/217.7 |

(Continued)

FOREIGN PATENT DOCUMENTS

| CA | 2246634 A1 | 10/1998 |
| CN | 101619076 A | 1/2010 |

(Continued)

OTHER PUBLICATIONS

West Virginia Department of Environmental Protection Division of Air Quality, Title V Fact Sheet R30-05300007-2010 (MM09) Dec. 10, 2013, Permittee: ICL-IP America Inc. Facility Gallipolis Ferry, West Virginia.

(Continued)

*Primary Examiner* — John M Cooney
(74) *Attorney, Agent, or Firm* — Robert D. Touslee (57) ABSTRACT

A spray foam formulation used to form a spray foam insulation layer in a wall structure is described. The formulation may include the reaction product of a polyisocyanate compound and a polyol compound; a fire retardant chosen from at least one of a non-halogenated fire retardant; and a reactive halogen-containing fire retardant, and a carbohydrate. The spray foam insulation layer has an insulative R value of 3.0 to 7.2 per inch, and a density of between about 0.3 to about 4.5 pcf. Further, spray foam insulation made from the spray foam formulation may have fire retardant characteristics that are equivalent to or better than a similar spray insulation foam insulation using non-reactive halogenated fire retardants such as tris(1-chloro-2-propyl)phosphate (TCPP).

23 Claims, 5 Drawing Sheets

(56) References Cited

U.S. PATENT DOCUMENTS

| | | | |
|---|---|---|---|
| 4,697,030 A | 9/1987 | Hardy et al. | |
| 4,808,744 A | 2/1989 | Hardy et al. | |
| 4,820,854 A | 11/1989 | Hardy et al. | |
| 4,883,891 A | 11/1989 | Hardy et al. | |
| 4,883,892 A | 11/1989 | Hardy et al. | |
| 4,886,895 A | 12/1989 | Hardy et al. | |
| 5,055,458 A | 10/1991 | Bailey et al. | |
| 5,097,057 A | 3/1992 | Hardy et al. | |
| 5,108,994 A | 4/1992 | Harnden et al. | |
| 5,117,033 A | 5/1992 | Hardy et al. | |
| 5,272,128 A | 12/1993 | Rosen et al. | |
| 5,739,173 A * | 4/1998 | Lutter | C08G 18/3851 521/99 |
| 5,952,327 A | 9/1999 | Waldeck et al. | |
| 5,981,612 A * | 11/1999 | Keppeler | C08G 18/3878 521/106 |
| 8,198,341 B2 | 6/2012 | Stowell et al. | |
| 9,169,278 B2 | 10/2015 | Stowell et al. | |
| 9,187,504 B2 | 11/2015 | Stowell et al. | |
| 2006/0241199 A1* | 10/2006 | O'Connor | C08G 18/4081 521/172 |
| 2007/0112084 A1 | 5/2007 | Hansel et al. | |
| 2010/0160468 A1* | 6/2010 | Stowell | C07F 9/4006 521/108 |
| 2011/0086217 A1* | 4/2011 | Crain | C08G 18/381 428/305.5 |
| 2011/0257287 A1 | 10/2011 | Stowell et al. | |
| 2013/0030067 A1* | 1/2013 | Mooney | C08G 18/5021 521/107 |
| 2014/0094531 A1* | 4/2014 | Kampf | C08J 9/0038 521/107 |
| 2014/0179814 A1 | 6/2014 | Mooney et al. | |
| 2014/0309321 A1 | 10/2014 | Stowell et al. | |
| 2015/0080487 A1 | 3/2015 | Stowell et al. | |

FOREIGN PATENT DOCUMENTS

| | | |
|---|---|---|
| EP | 0409181 A2 | 7/1990 |
| EP | 0570706 A1 | 4/1993 |
| EP | 0908464 A1 | 10/1998 |
| GB | 0682706 A | 11/1952 |
| GB | 1420543 A | 1/1976 |
| WO | 2014056138 A1 | 4/2014 |
| WO | 2014062313 A1 | 4/2014 |

OTHER PUBLICATIONS

Ivanov et al, "Reaction in the System Trialkyl Phosphite-Carboxamide or Secondary Amine," Bulletin of the Academy of Sciences of the USSR, Division of Chemical Science, Dec. 1971, pp. 2629-2632, vol. 20, No. 12.

Gajewiak et al, "Synthesis and Molecular Recognition of Phosphatisylinositol-3-Methylenephosphate," Organic Letters. Jun. 22, 2006, pp. 2811-2813, vol. 8, No. 13, American Chemical Society.

EverGuard TPO/PVC Mechanically Attached Rooting Systen Overview & General Requirements Manual, title page through 65, published 2012, published by GAF.com.

* cited by examiner

SPRAY FOAMS CONTAINING NON-HALOGENATED FIRE RETARDANTS

CROSS REFERENCE TO RELATED APPLICATIONS

This application is a divisional of U.S. application Ser. No. 14/750,397, filed Jun. 25, 2015, titled "Spray Foams Containing Non-Halogenated Fire Retardants", which claims the benefit of priority of U.S. Provisional Application No. 62/026,122 filed Jul. 18, 2014, titled "Spray Foams Containing Non-Halogenated Fire Retardants". The entire disclosures of these applications are hereby incorporated by reference, for all purposes, as if fully set forth herein.

BACKGROUND OF THE INVENTION

Spray foams are widely used as building insulation materials due to their excellent thermal insulation, fire resistance, and mechanical properties. The foams are commonly grouped as either "open cell" foams or "closed cell" foams depending on whether the cells in the foam are completely closed. Spray polyurethane foams (SPFs) made from polyurethane (PUR) are used in both open cell and closed cell foams, while spray isocyanurate foams are made from polyisocyanurate (PIR) and is normally used to make dense closed cell foams.

Spray foam insulation is often formed as the polymerizing reactants are being sprayed directly into the building envelope to be insulated, usually with the help of a blowing agent. In order to pass the fire tests required by modern building codes, such as the ASTM E-84 test, additional fire retardants are commonly added to the PUR and PIR formulations. These fire retardants may include non-reactive, halogenated fire retardants such a tris(1-chloro-2-propyl) phosphate or TCPP, which imparts increased fire resistance to the foams by generating both gas-phase, radical scavenging chlorine groups, as well as forming a char that is difficult for flames to penetrate.

More recently, non-reactive halocarbons like TCPP have come under scrutiny for health and environmental reasons. Unlike reactive halogenated fire retardants that react with and stay bound to the polymer matrix of the spray foam, non-reactive halogenated fire retardants can escape from the spray foam over time and become an airborne pollutant. Consequently, there has been an increased effort to reduce or eliminate the use of non-reactive halogenated compounds as fire retardants in furniture, fabrics and building insulation. The reduction in the use of TCPP and other non-reactive halogenated fire retardants has made it more challenging for PUR and PIR foams to pass modern fire tests, necessitating the need for new formulations with enhanced fire resistance that only use reactive halogen flame retardants and/or non-halogen containing flame retardants. The present application describes such formulations and their use in foams for building insulation and other articles.

BRIEF SUMMARY OF THE INVENTION

Formulations for thermoset spray foams are described that include reactive halogenated fire retardants, non-halogenated fire retardants, or both. In some formulations carbohydrates are included as char forming agents that thermally decompose into a char, which increases the resistance of the spary foam article to flame penetration. The application also describes methods of making the spray foams from formulations that include the reactive halogenated and/or non-halogenated fire retardants.

The spray foam formulations include polyurethane spray foams (PUR foams) and polyisocyanurate spray foams (PIR foams). Depending on the specific compounds used in the PUR foams, such as the type of blowing agent used, the foam may be open-cell or closed-cell. PIR foams are typically closed-cell when non-aqueous blowing agents are used. For both PUR and PIR formulations, the reactive halogenated and non-halogenated fire retardants described herein may be used to increase the fire resistance of the foams.

Exemplary reactive halogenated fire retardants include at least one halogen group (e.g., a fluorine group, a chlorine group, and bromine group, etc.) and a reactive group that can react with the reactants and/or polymerized products of the spray foam. Exemplary reactive groups may include hydroxyl groups (—OH), and carboxylic groups (—C=O) such as an organic acid groups (—COOH). Exemplary reactive halogenated fire retardants may include halogenated polyether-polyols such as Ixol B 125, Ixol B 251, and Ixol B 350 manufactured by Solvay Chemicals. Additional examples of reactive halogenated fire retardants include tetrabromophthalate diol sold under the tradename PHT4-DIOL by Great Lakes Solutions, and SaFRon® 6605 made by ICL Industrial Products.

Exemplary non-halogenated fire retardants may include organo-phosphorous compounds such as organo-phosphate compounds, organo-phosphite compounds, or organo-phosphonate compounds, as well as combinations thereof. Exemplary organo-phosphate compounds include alkyl and/or aryl phosphate compounds such as butyl diphenyl phosphate, dibutyl phenyl phosphate, triethyl phosphate, and triphenyl phosphate, among others. Exemplary organo-phosphite compounds include alkyl and/or aryl phosphite compounds such as butyl diphenyl phosphite, dibutyl phenyl phosphite, triethyl phosphite, and triphenyl phosphite, among others. Exemplary organo-phosphonate compounds include alkyl, aryl, and/or hydroxyalkyl phosphonates such as diethylhydroxymethylphosphonate (DEHMP).

Embodiments of the invention include spray foam formulations for open cell and closed cell foams that include at least one reactive halogenated and/or non-halogenated fire retardant. Exemplary formulations include polyurethane (PUR) formulations that have one or more polyisocyanate compounds and one or more polyol compounds that react to form the polyurethane. The PUR formulation may also include at least one blowing agent, PUR polymerization catalyst, surfactant, and non-halogenated fire retardant. In some embodiments, the PUR formulation may further include carbohydrate. Exemplary formulations also include polyisocyanurate (PIR) formulations that have one or more polyisocyanate compounds and one or more polyol compounds react to form the polyisocyanurate. The PIR formulation may also include at least one blowing agent, PIR polymerization catalyst, surfactant, and reactive halogenated and/or non-halogenated fire retardant. In some embodiments, the PIR formulation may further include a carbohydrate. The reactive halogenated and/or non-halogenated fire retardant reduces or eliminates the presence of non-reactive halogenated fire retardants in the spray foam.

Embodiments of the invention also include an insulation layer formed from the spray foams made with the above-described formulations. Exemplary insulation layers may include open-cell, spray polyurethane foams (SPFs) formed in a wall structure. The formulation may include a reactive halogenated and/or non-halogenated fire retardant and a carbohydrate, both of which increase the fire retardant properties of the foams. Specifically, the SPF exhibits an Appendix X and/or an ASTM E-84 performance equivalent with or better than a similar spray insulation material having a non-reactive halogenated fire retardant such as TCPP. In addition, the open-cell SPF has an insulative R value of between 3.0 and 7.2 per inch and a density of between about 0.3 to about 4.5 pcf.

Embodiments of the invention still further include an insulated structure comprising a plurality of structural support members coupled together to form a frame. A plurality of first wall boards may be attached to an exterior side of the frame to form an exterior wall or surface of the structure. A plurality of second wall boards may be attached to an interior side of the frame to form an interior wall or surface of the structure, wherein the structural support members, the first wall boards, and the second wall boards may define a plurality of wall cavities. A spray insulation material may be positioned within at least one of the wall cavities of the structure. The spray insulation material comprises a spray foam made with the above-described formulations. For example, the spray foam may be an open-cell SPF having an insulative R value of between 3.0 and 7.2 per inch and a density of between about 0.3-4.5 pcf. The SPF may include a reactive halogenated and/or non-halogenated fire retardant, and a carbohydrate, both of which increase the fire retardant properties of the foam.

Embodiments of the invention also further include methods of insulating a component of a building. The methods may include coupling a plurality of structural support members together to form a frame, attaching a plurality of first wall boards to an exterior side of the frame to form an exterior wall or surface of the structure, and attaching a plurality of second wall boards to an interior side of the frame to form an interior wall or surface of the structure. The structural support members, the first wall boards, and the second wall boards may define a plurality of wall cavities. The methods may further include positioning a spray insulation material within at least one of the wall cavities of the structure to insulate an interior space of the structure. The spray insulation material may be made from one of the above-described formulations. For example, the spray insulation material may be an open-cell SPF having an insulative R value of between 3.0 and 7.2 per inch and a density of between about 0.3 to about 4.5 pcf. The open-cell SPF may include a reactive halogenated and/or non-halogenated fire retardant, and a carbohydrate, both of which increase the fire retardant properties of the foam.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The embodiments described include spray foam formulations that include a reactive halogenated and/or a non-halogenated fire retardant. The embodiments described herein also provide a wall system that includes spray foam products made with the present spray foam formulations. The spray foam products demonstrate similar or better fire performances in ASTM E-84 and/or ASTM E1354 tests when compared to similar foam products that contain a non-reactive halogenated fire retardant such as TCPP, chlorinated biphenyls, and halogenated hydrocarbons, among other non-reactive halogenated fire retardants. In some embodiments, the spray foam formulations may also include a carbohydrate that enhances the fire retardant properties of the spray foam product by thermally decomposing into a char that acts as a flame penetration barrier.

Exemplary Spray Foam Formulations (i) Exemplary Fire Retardants

The present spray foam formulations include one or more reactive halogenated and/or non-halogenated fire retardants that reduce or eliminate the need for non-reactive halogenated fire retardants.

The reactive halogenated fire retardants may include at least one halogen group (e.g., a fluorine group, a chlorine group, and bromine group, etc.) and a reactive group that can react with the reactants and/or polymerized products of the spray foam. Exemplary reactive groups may include hydroxyl groups (—OH), and carboxylic groups (—C=O) such as an organic acid groups (—COOH). Exemplary reactive fire retardants may include halogenated polyether polyols such as Ixol B 125, Ixol B 251, and Ixol B 350 manufactured by Solvay Chemicals. Additional examples of reactive halogenated fire retardants include tetrabromophthalate diol sold under the tradename PHT4-DIOL by Great Lakes Solutions, and SaFRon® 6605 made by ICL Industrial Products.

Exemplary non-halogenated fire retardants may include organo-phosphate compounds, organo-phosphite compounds, and organo-phosphonate compounds. The organo-phosphate compounds can have the general formula:

Organo-Phosphate Compounds where $R^1$, $R^2$ and $R^3$ are independently an alkyl group, an olefin group, a hydroxy alkyl group, or an aromatic group. Exemplary organo-phosphate compounds include butyl diphenyl phosphate, dibutyl phenyl phosphate, triphenyl phosphate, and triethyl phosphate (TEP), among other organo-phosphate compounds.

The organo-phosphite compounds can have the general formula:

Organo-Phosphite Compounds where $R^1$, $R^2$ and $R^3$ are independently an alkyl group, an olefin group, a hydroxy alkyl group, or an aromatic group. Exemplary organo-phosphite compounds include tris(2,4-di-t-butylphenyl)phosphite.

The organo-phosphonate compounds can have the general formula:

Organo-Phosphonate Compounds where $R^1$, $R^2$ and $R^3$ are independently an alkyl group, an olefin group, a hydroxy alkyl group, or an aromatic group. Exemplary organo-phosphonate compounds include diethyl hydroxylmethyl phosphonate (DEHMP), dialkyl hydroxyalkanephosphonate (e.g., dimethyl hydroxymethylphosphonate), and diaryl hydroxyalkanephosphonate (e.g., diphenyl hydroxymethylphosphonate) among other organo-phosphonate compounds.

Exemplary spray foam formulations include the use of one of more of the above classes of phosphorous-containing, non-halogenated fire retardants. For example, the spray foam formulation may include an organo-phosphate compound, an organo-phosphite compound, or an organo-phosphonate compound. Additional examples include a combination of an organo-phosphate compound and organo-phosphite compound, a combination of an organo-phosphate compound and organo-phosphonate compound, or a combination of an organo-phosphite compound and organo-phosphonate compound.

Further examples include combinations of an organo-phosphate compound, an organo-phosphite compound, and an organo-phosphonate compound.

(ii) Polyurethane Formulations

Exemplary polyurethane formulations for spray polyurethane foams (SPFs) include (i) a polyisocyanate reactant and (ii) a polyol reactant. The SPFs are made by combining separate liquid mixtures that include the polyisocyanates (the A-side mixture) and the polyols (the B-side mixture) and then immediately spraying the combined mixtures through a spray machine directly into a building envelope to be thermally insulated, such as a wall and joist cavity. The spray machine may include a first transfer pump for carrying the A component and a second transfer pump for carrying the B component. The A and B components are transferred at a 1:1 volume ratio through a heated dual hose into a spray gun, where the components mix together to form the SPF product that is released for administration at the building envelope. In some practices, the SPF product may be stored in and administered from a smaller, portable can that maintains the A-side and B-side mixtures in two separate drums or containers until ready to combine and dispense. In other practices, the SPF liquids can be stored as a pre-combined and partially-reacted blend.

The A-side mixture of the SPF may include one or more polyisocyanate compounds. Exemplary polyisocyanates may include substituted or unsubstituted polyisocyanates, and may more specifically include aromatic, aliphatic, and cycloaliphatic polyisocyanates having at least two isocyanate functional groups. Specific exemplary aromatic polyisocyanates include 4,4'-diphenylmethane diisocyanate (MDI), polymeric MDI (PMDI), toluene disisocyanate, and allophanate modified isocyanate. A commercial example of a PMDI that may be used in the present formulations is Rubinate® M manufactured by Huntsman Polyurethanes of The Woodlands, Tex. This PMDI has a viscosity range of about 200 to about 300 cps at 25° C. (e.g., 190 cps at 25° C.), a functionality range of about 2.3 to about 3.0, and an isocyanate content that ranges from about 28% and about 35% (e.g., 31%).

The B-side mixture of the SPF may include one or more polyol compounds. Exemplary polyols may include polyether polyols, polyester polyols, and mannich polyols. Polyether polyols may be made by polymerizing one or more types of epoxides, such as ethylene oxide or propylene oxide. The may also be made by polymerizing the epoxide with a polyol such as a diol (e.g., glycol), triol (e.g., glycerin), or other polyol. Exemplary polyether polyols may include polyether diols such as polyether polyethylene glycol, polypropylene glycol, and poly(tetramethylene ether) glycol, among other polyether diols. Additional exemplary polyether polyols that may be used in the present formulations are sold under the tradename Jeffol® by Huntsman Polyurethanes of The Woodlands, Tex.

Polyester polyols may be made by the stepwise polymerization of polyols and polycarboxylic acids. For example, polyester polyols may be formed by the reaction of a glycol such as diethylene glycol with a dicarboxylic acid such as phthalic acid to form an aromatic polyester polyol. Commercially available polyester polyols that may be used with the present formulations include those sold by Stepan Company under the name Stepanol® and those sold by Huntsman Corporation under the name of Terol®. Exemplary polyester polyols may have a functionality between 2 and 2.8 and hydroxyl number between 150 mg KOH/gm and 450 mg KOH/gm.

Mannich polyols may be made by the alkoxylation of mannich bases with, for example, propylene oxide and/or ethylene oxide. Additional exemplary mannich polyols that may be used in the present formulations are sold under the tradename Jeffol® (e.g., Jeffol® R-350X, R-425X, and R-470X) by Huntsman Polyurethanes of The Woodlands, Tex.

Exemplary SPF formulations may also include one or more catalysts for catalyzing the polymerization reaction between the polyisocyanate and polyol compounds to make the polyurethane. Exemplary catalysts may include amine compounds and metal complexes. Exemplary amine catalysts may include tertiary amines such as triethylenediamine (TEDA), dimethylethanolamine (DMEA), dimethylcyclohexylamine (DMCHA), and N-[3-(dimethylamino)propyl]-N,N',N-trimethyl-1,3propanediamine sold under the tradename Polycat® 77 by Air Products and Chemicals, Inc. Exemplary catalytic metal complexes may include carboxylates, oxides, and mercaptides of mercury, lead, tin, bismuth, potassium, and zinc. The metal catalysts may replace some or all of the amine catalysts in the SPF formulation. For example, the metal catalysts may be used exclusively in the SPF formulation, and no amine catalysts are included in the formulation.

Exemplary SPF formulations may further include one or more initiators that speed the start of the polyurethane polymerization reaction. Unlike catalysts, an initiator is consumed during the polymerization reaction and becomes part of the SPF foam product. Exemplary initiators may include aliphatic and aromatic polyamines, such as ethylene diamine, toluene diamines such as a combination of 3,5-diethyltoluene-2,4-diamine and 3,5-diethyltoluene-2,6-diamine sold under the tradename Ethacure® 100 by Albemarle Corp, and polyetheramines such as Jeffamine® T-403 and D-230 sold by Huntsman Corporation, among others.

Exemplary SPF formulations may still further include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, Tergostab® series surfactants from Evonik, such as Tergostab® 8535, and Silstab 2760 from Siltech Corporation.

Exemplary SPF formulations may also include the reactive halogenated and/or non-halogenated fire retardants described above. In some embodiments, these non-halogenated fire retardants reduce the amount of non-reactive halogenated fire retardants such as TCPP use in the SPF. In additional embodiments, the reactive halogenated and/or non-halogenated fire retardants eliminate the presence of non-reactive halogenated fire retardants such as TCPP in the SPF formulation.

Some exemplary SPF formulations may include a carbohydrate such as a monosaccharide, an oligosaccharide, and/or a polysaccharide. Specific examples include sucrose and/or high-fructose corn syrup (HFCS), among other carbohydrates. While the carbohydrates include a plurality of hydroxyl groups, they are not believed to react with the polyisocyanates to as great an extent as the urethane polyols, and in some formulations they may not react at all. The carbohydrates function as a char forming agent that thermally decompose into a char that slows or stops the progression of flames though the SPF material. As discussed further below, it has been discovered that the carbohydrate char forming properties used in combination with the reactive halogenated and/or non-halogenated fire retardants can make open-cell foam materials with Appendix X and/or an ASTM E-84 performance equivalent with or better than a SPFs using non-reactive halogenated fire retardants such as TCPP, chlorinated biphenyls, or halogenated hydrocarbons, among other non-reactive halogenated fire retardants.

Exemplary polyurethane formulations may include formulations for open-cell spray foams and closed-cell spray foams. One difference between the open-cell and closed-cell polyurethane spray foam formulations is the blowing agent used: In open-cell polyurethane spray foam formulations the blowing agent may be water or an aqueous solution. In closed-cell polyurethane spray foam formulations the blowing agent may be a liquid or gas, such as a hydrocarbon (e.g., pentane) and/or a fluorocarbon gas or liquid (e.g., HFC 245fa, HFO 1233zd).

For open-cell SPF formulations that use water or an aqueous solution as the blowing agent, water soluble polyols may be used. For example, the open-cell SPF formulation may include a single, water-soluble polyol, such as a polyether polyol. Additional exemplary open-cell SPF formulations may include a combination of polyols where the polyether polyol or polyols have the highest concentration relative to other polyols such as polyester polyols and/or mannich polyols. The open-cell SPF formulations may also include a carbohydrate and a reactive halogenated and/or non-halogenated fire retardant to increase the fire resistance and flame penetration resistance of the open-cell SPF material.

(iii) Polyisocyanurate Formulations

Exemplary polyisocyanurate formulations for spray foams include (i) a polyisocyanate reactant and (ii) a polyol reactant. While similar classes of reactants are used for polyisocyanurate (PIR) and polyurethane (PUR) foam formulations, the PIRs are formed under conditions that promote the trimerization of the polyisocyanate reactants into isocyanurate rings. The reaction scheme below shows the formation of a isocyanurate ring from the trimerization of three generic diisocyanate molecules:

The polyisocyanate reactants (e.g., diisocyanate reactants) still leave active isocyanate groups on the isocyanurate ring after trimerization which can react with additional polyisocyanurate reactants and the polyol reactants. The isocyanurate rings react with the polyols to form a cross-linked polyisocyanurate polymer. When the polyisocyanurate polymer is formed while being sprayed with the help of a blowing agent, it forms a PIR foam. The presence of isocyanurate rings in the molecular structure of a PIR foam normally impart greater stiffness, higher density, and higher resistance to chemical and thermal breakdown compared with polyurethane foams.

Because a distinguishing characteristic of the PIR formation is the trimerization of the isocyanate reactant to form isocyanurate rings, PIR formulations generally have a larger molar portion the polyisocyanate to polyol, and include polyisocyanate trimerization catalysts. In many instances, the polyols used in the formulations are also different.

Exemplary polyisocyanate and polyol reactants used in the PIR formulations may be the same as those described above for the SPF formulations. For example, polyisocyanates used in the PIR formulations may include diisocyanates such as include 4,4'-diphenylmethane diisocyanate (MDI), polymeric MDI (PMDI), toluene disisocyanate, and allophanate modified isocyanate, among other diisocyanate compounds. Exemplary polyols used in PIR formulations may include polyester polyols such as aromatic polyester polyols. They may also optionally include polyether polyols and/or mannich polyols.

Catalysts used in polyisocyanurates foam formulations normally include trimerization catalysts that catalyze the formation of cyclic isocyanurate trimers from the polyisocyanate reactant. Exemplary trimerization catalysts include tertiary amines, such as pentamethyldiethylenetriamine (PMDETA), dimethylcyclohexylamine, and 1,3,5-tris(3-(dimethylamino)propyl)-hexahydro-triazine. Exemplary catalysts may also include metal catalysts, such as potassium octoate and potassium acetate, and quaternary ammonium salts such as Polycat® TMR sold by Air Products and Chemicals, Inc.

The present polyisocyanurate formulations may also include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, and Tergostab® series surfactants from Evonik, such as Tergostab® 8535.

The present polyisocyanurate formulations may also include the reactive halogenated and/or non-halogenated fire retardants described above. In some embodiments, these reactive halogenated and/or non-halogenated fire retardants reduce the amount of halogenated fire retardants such as TCPP use in the foams. In additional embodiments, the reactive halogenated and/or non-halogenated fire retardants eliminate the presence of a halogenated fire retardant such as TCPP in the PIR formulation.

Select embodiments of the present polyisocyanurate formulations may further include one or more of initiators and carbohydrates.

The PIR formulations are generally used to make closed-cell spray foams, although open-cell PIR spray foams are also contemplated for the present formulations. The blowing agents used to make the foam may include hydrocarbon gas (e.g., n-pentane, iso-pentane, cyclo-pentane, etc.) and fluorocarbon gas, among others. Specific examples of fluorocarbon gases may include HFC-245fa (i.e., 1,1,1,3,3-pentafluoropropane) commercially available under the tradename Enovate® from Honeywell Corp., and HFC-365mfc (i.e., $CF_3CH_2CF_2CH_3$).

Exemplary Spray Foam Insulation Systems

Figure 1:
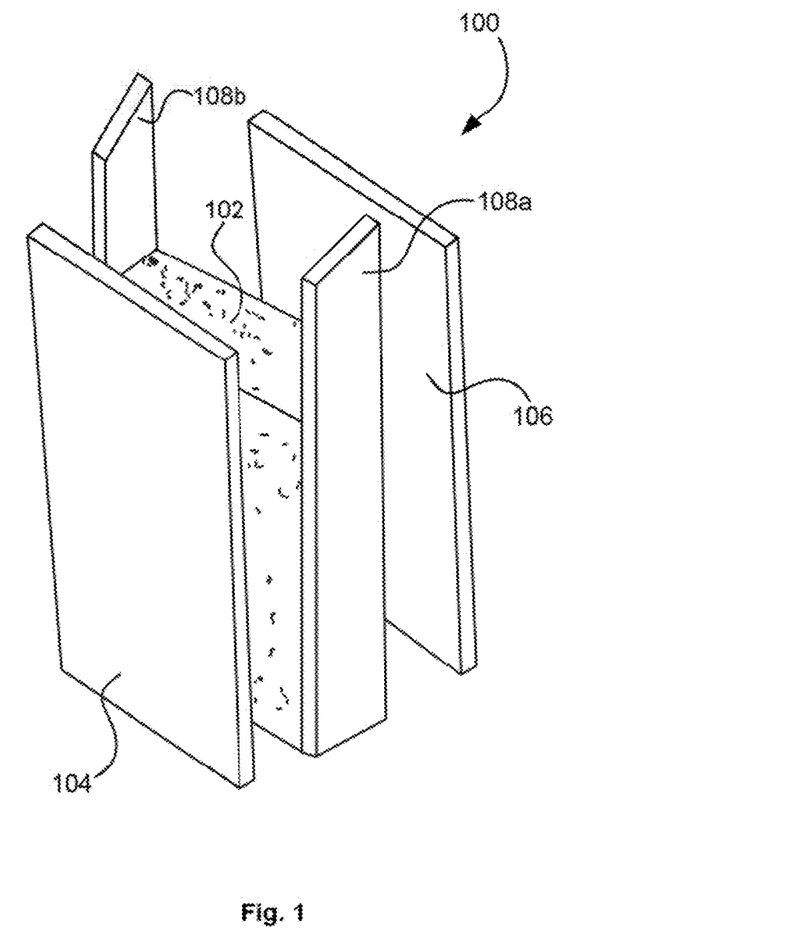
FIG. 1 illustrates an embodiment of a simplified exploded view of a spray foam insulation positioned within a wall cavity.

Referring now to FIG. 1, an insulation system 100 is shown with spray foam insulation 102 positioned between a first wall board 104 and second wall board 106 attached to structural support members 108. The spray foam insulation 102 may include open cell foam insulation, closed cell foam insulation, or a combination of both open and closed cell foam insulation.

Open cell foam insulations are characterized by a lower density in a range from about 0.3-1.8 pcf or pounds per cubic foot, while closed cell foam insulations include intermediate to higher density at a range from about 1.75-4.50 pcf. For example, open cell foam insulation may have a density from about 0.3-0.7 pcf (e.g., about 0.5 pcf), and closed cell foam insulation may have a density from about 1.8-4.0 pcf. Both open and closed cell foam insulations have high insulation value, or R-value, and thus offer high resistance to heat flow. The selection of open or closed cell foam insulation may be based on several factors, including, for example, insulating power, air and moisture permeability, strength, rigidity, water resistance, density, acoustic absorption levels, and the like.

Still referring to FIG. 1, the spray foam insulation 102 is fire resistant and passes the ASTM E-84 and/or Appendix X fire tests without presence of non-reactive halogenated fire retardants, such as TCPP. The ASTM E-84 tunnel test is a common fire test that is required for plastic foam insulation used in either wall or roof insulation systems. The test requires measuring the flame spread and smoke density that is generated by the foam core in response to exposure to a flame. Most polyurethane spray foams can only pass this test by using non-reactive halogenated fire retardants. The non-reactive halogenated fire retardants enable the insulation to pass this test due to the fire retardants' dual function of gas phase radical scavenging and char formation in the solid phase.

Appendix X is a common fire test for spray foam insulation. The test procedure is a modified NFPA 286, "Standard Methods of Fire Tests for Evaluating Contribution of Wall and Ceiling Interior Finish to Room Fire Growth," method. A passing test is when the time for attainment of the four measured test parameters is 4 minutes 18 seconds or greater. The four parameters are the time at which flames exit the doorway, the Heat Release Rate exceeds 1 MW, the heat flux to the floor exceeds 20 $kW/m^2$, and the average upper layer temperature exceeds 600° C. Most spray foams can only pass this test by covering the spray foam layer with an intumescent coating, which incurs additional costs and labor during installation.

It is therefore surprising to discover that the spray foams described herein that include reactive halogenated and/or non-halogenated fire retardant exhibits a similar or better fire-retardant performance in relation to the ASTM E-84 and ASTM E1354-11 b tests than conventional spray polyurethane foams that include a non-reactive halogenated fire retardant (e.g., TCPP). The observed increase in fire-retardant performance may be due to an ability of the spray polyurethane foam to form a sufficiently stable char such that the use of a non-reactive halogenated fire retardant becomes unnecessary.

The test results show that the spray foam insulation 102 that includes reactive halogenated and/or non-halogenated fire retardants can form a stable char so that non-reactive halogenated fire retardants become unnecessary in the formulation. As noted above, the non-halogenated fire retardants may include one or more phosphorous-containing compounds such as organo-phosphate compounds, organo-phosphite compounds, and/or organo-phosphonate compounds. The non-halogenated fire retardants may also be non-reactive or reactive (e.g., containing isocyanate reactive functionality). Specific examples of non-reactive non-halogenated fire retardants may include a blend of butyl diphenyl phosphate, dibutyl phenyl phosphate, and triphenyl phosphate. Organo-phosphonate compounds such as DEHMP may be examples of reactive non-halogenated fire retardants.

Small-scale torch and Appendix X mimic tests demonstrate that the open cell SPF foam insulation made from formulations with phosphorous-containing non-halogenated fire retardants yield similar or better fire test performance in comparison to a control containing non-reactive halogenated fire retardants. The Appendix X mimic test uses the same fire source as the Appendix X I ASTM E 286 fire test with a test sample size reduced to two 4×8 foot panels and a 4×4 foot ceiling in the corner. The results suggest that the free radical-scavenging fire-retarding function, which non-reactive halogenated fire retardants have traditionally provided, can be replaced by way of improving char formation and char stability of the polymer network of the compounds forming the fire retardant. The Appendix X test results of the open cell SPF insulation is indicative of the similar performance expected from the closed cell foam insulation formulations described further below.

Turning back to FIG. 1, the spray foam insulation 102 described herein is made with reactive halogenated and/or non-halogenated fire retardants, and may be an open cell SPF that passes the ASTM E-84 and Appendix X fire tests. For instance, exemplary open cell SPF formulations may include combinations of components and concentrations (in parts by weight) listed below in Tables 1-3.

TABLE 1

First exemplary non-halogenated open cell SPF formulation.

| Component | Parts |
|---|---|
| HFCS | 20-50 |
| Polyol | 2-10 |
| TEP | 5-15 |
| DEHMP | 10-25 |
| Amine catalysts | 4-10 |
| NP-9 | 5-15 |
| Silicone surfactant | 0.5-2 |
| Water | 10-20 |

TABLE 2

Second exemplary non-halogenated open cell SPF formulation.

| Component | Parts |
|---|---|
| Polyether Polyol 1 | 15-19 |
| Polyether Polyol 2 | 14-18 |
| Non-Reactive Organophosphate | 10-14 |
| DEHMP | 13-17 |
| Amine catalysts | 8-12 |
| Tergitol NP-9 | 8-12 |
| Silicone surfactant | 0.5-2 |
| Water | 18-21 |

TABLE 3

Exemplary reactive-halogenated fire retardant open cell SPF formulation.

| Component | Parts |
|---|---|
| Sucrose | 30-36 |
| Aliphatic Polyamine | 0.1-0.5 |
| Reactive Halogenated Fire Retardant | 6-10 |
| TEP | 15-19 |
| Amine catalysts | 8-12 |
| Ecosurf SA-9 | 4-8 |
| Silicone surfactant | 0.5-2 |
| Biocide | 0.5-1 |
| Water | 22-26 |

In additional embodiments, the spray foam insulation 102 described herein is made with reactive halogenated and/or non-halogenated fire retardants, and may be a closed cell SPF that passes the ASTM E-84 and Appendix X tests. Exemplary closed-cell spray foam formulations may include combinations of components and concentrations (in parts by weight) listed below in Tables 4-6:

TABLE 4

First Exemplary non-halogenated closed cell SPF formulation.

| Component | Parts |
|---|---|
| Polyester polyol | 20-50 |
| Manich polyol | 5-20 |
| DEHMP | 5-20 |
| TEP | 3-10 |
| Amine catalysts | 1-7 |
| Metal catalyst | 0.1-1 |
| Silicone surfactant | 0.5-2 |
| Blowing agent | 5-20 |

TABLE 5

Second exemplary non-halogenated closed cell SPF formulation.

| Component | Parts |
|---|---|
| Polyester polyol | 40-45 |
| Manich polyol | 20-25 |
| Polyether Polyol | 3-4 |
| Non-Reactive Organophosphate | 6-8 |
| Reactive Phosphorous Fire Retardant | 5-9 |
| Amine catalysts | 1-3 |
| Metal catalyst | 4-5 |
| HFO Blowing agent | 10-13 |
| Silicone surfactant | 0.5-2 |
| Water | 1-2 |

TABLE 6

Exemplary reactive-halogenated closed cell SPF formulations.

| Component | Parts Ex. 1 | Parts Ex. 2 |
|---|---|---|
| Polyester polyol | 40-45 | 37-41 |
| Manich polyol | 20-25 | 22-26 |
| Polyether Polyol | 3-4 | 2-6 |
| Reactive Halogenated Fire Retardant | 8-10 | 8-12 |
| Reactive Phosphorous Fire Retardant | 3-6 | 4-8 |
| Amine catalysts | 1-3 | 2-6 |
| Metal catalyst | 4-5 | 0.1-0.2 |
| HFC-245fa | 0 | 8-12 |
| 1,2 TDCE | 0 | 1-3 |
| HFO Blowing agent | 10-13 | 0 |
| Silicone surfactant | 0.5-2 | 0.5-2 |
| Water | 1-2 | 1-2 |

The spray foam insulation 102 shown in FIG. 1 is functioning as insulation material for a wall system. The spray foam insulation 102 typically have insulative R-values of 3.0 to 4.5 per inch for open cell foams and insulative R-values of 5.8 to 7.0 per inch for closed-cell foams, and exhibit an Appendix X and an ASTM E-84 performance equivalent with or better than a similar spray insulation material having non-reactive halogenated fire retardants.

Exemplary embodiments have the spray foam insulation 102 comprising a SPF layer that includes a reactive halogenated and/or non-halogenated fire retardant such as one or more of organo-phosphate, organo-phosphite, and/or organo-phosphonate.

Examples of non-halogenated fire retardants include isocyanate-reactive fire retardants produced from a reactive fire retardant component and a non-reactive fire retardant component. Specific examples of the non-reactive fire retardant component may include one or more organo-phosphate compounds such as triethyl phosphate (TEP), butyl diphenyl phosphate, dibutyl phenyl phosphate, and/or triphenyl phosphate. A specific example of a reactive non-halogenated fire retardant component may be a hydroxyl-containing organo-phosphonate compound such as diethyl hydroxymethylphosphonate (DEHMP). In some embodiments, both reactive and non-reactive non-halogenated fire retardant components are phosphorous-containing components. It is contemplated that a ratio of the reactive fire retardant component to the non-reactive fire retardant component is greater than or equal to 1.

Exemplary spray foam insulation 102 described herein may be free of non-reactive halogenated fire retardants such as TCPP. In some embodiments, such as when the spray foam insulation 102 is made from an open cell SPF, a reactive halogenated and/or non-halogenated fire retardant may be combined with a carbohydrate (e.g., high-fructose corn syrup), which may aid in char formation that allows the spray foam insulation 102 to pass the Appendix X and/or the ASTM E-84 fire tests. In particular, production of char on a surface of the spray foam insulation 102 exposed to a flame during testing prevents the flame from penetrating a material thickness of the spray foam insulation 102. In some examples, the carbohydrate may replace the non-reactive halogenated fire retardant component in the spray foam insulation 102. In additional examples, a reactive halogenated and/or non-halogenated fire retardant component is included in the formation and adds to the radical scavenging capabilities that retards the flames. The carbohydrate and reactive halogenated and/or non-halogenated fire retardant components may together have a synergistic effect in reducing flame and burning.

In examples where spray foam insulation 102 is an SPF, the polyol used in the SPF formulations may include a polyether polyol and/or polyester polyol having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

An exemplary formulation for a SPF spray foam insulation 102 may have an isocyanate index greater than about 200, commonly between about 200 and 300, and more commonly between about 250 and 270. When a polyisocyanate reacts with a polyol to form a urethane bond, one NCO group reacts with one OH group. As is known in the art, the index is defined as the ratio of NCO group to OH group multiplied by 100 as shown in the formula below:

$$\text{Index} = \frac{\text{Moles of } NCO \text{ group}}{\text{Moles of } OH \text{ group}} \times 100$$

When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 250 and 270, provides at least a 2:1 ratio of NCO groups to OH groups, which has been found to provide an appreciable combination of structure integrity, thermal strength and/or stability, and fire resistance.

The above described index values also typically require less fire retardant materials to be used to enable passing of the ASTM E-84 and/or ASTM E1354-11 b tests. For example, conventional spray polyurethane foam has an isocyanate index of less than 200 and commonly requires the application or use of significantly more fire retardant materials to enable these products to pass the ASTM E-84 and/or ASTM E1354-11 b tests. In some embodiments, the spray polyurethane foam formulations described herein may include between about 2 to 5 wt. % of reactive halogenated and/or non-halogenated fire retardant (e.g., a phosphorous-containing non-halogenated fire retardant). Conventional closed-cell spray polyurethane foam formulations typically include between about 3 to 4 wt. % of a non-reactive halogenated fire retardant, such as TCPP. Open-cell spray polyurethane foams typically use even more non-reactive halogenated fire retardant, with about 15 wt. % or more in the open-cell spray foam.

It is contemplated that the spray polyurethane foam insulation is able to form a sufficiently stable char when exposed to flame conditions in accordance with an ASTM E-84 that enables the insulation to pass the ASTM E-84 test. The reactive halogenated and/or non-halogenated fire retardant promotes charring in the solid phase, which reduces the fuel supply to the flame and effectively decrease the temperature of the flame that may further decompose the polymer. Spray foam insulation 102 made from the present formulations may have an average foam cell size of less than about 200 microns, for example between about 100 microns and about 150 microns. In contrast, conventional spray polyurethane foams typically have an average foam cell size of between about 200 and 300. The smaller foam cell size of the present spray foam insulations may impart an increased R-value compared with conventional spray polyurethane foams having larger sized foam cells.

In some embodiments, the spray foam insulation 102 may include between 1 and 15 weight percent of a blowing agent, such as water, aqueous solutions, fluorocarbons, and hydrocarbons. Exemplary fluorocarbon blowing agents include FHC 245fa and blends with water. In an exemplary embodiment, the spray foam insulation 102 may include between 5 and 8 weight percent of the blowing agent. The weight percent of the blowing agent typically corresponds with the foam density of the spray foam insulation, with lower density spray foams having a higher weight percentage of the blowing agent than more dense spray foams. For example, closed-cell spray foam insulation having a density of between about 1.5 and 2.5 pounds per cubic foot (lbs/ft$^3$), commonly have 5% or more of the blowing agent by weight, and more commonly between about 6 and 7 weight percent. In contrast, spray foam insulation with a density of up to 10 lbs/ft$^3$, and more commonly between 6 and 7 lbs/ft$^3$, commonly have less than 5% of the blowing agent by weight, and more commonly between about 1.5 and 3 weight percent.

Exemplary Wall Systems

Wall structures or systems of commercial and residential structures are commonly insulated by filling a wall cavity that is positioned between wall studs (wood or metal). The wall cavity may be filled using a spray foam insulation (open cell and/or closed cell, such as the spray foam insulation 102) or in combination with a Batt or roll insulation (e.g., fiberglass, mineral wool, cotton, and the like), loose fill insulation (e.g., fiberglass, cellulose, mineral wool, and the like). Thermal bridging from the wall studs can reduce the effectiveness of the cavity insulation. To reduce the effects of thermal bridging, the wall system or structure may include external sheathing insulation (e.g., continuous external sheathing), such as with a foil faced rigid foam board, that is coupled with the cavity insulation.

Figure 2:
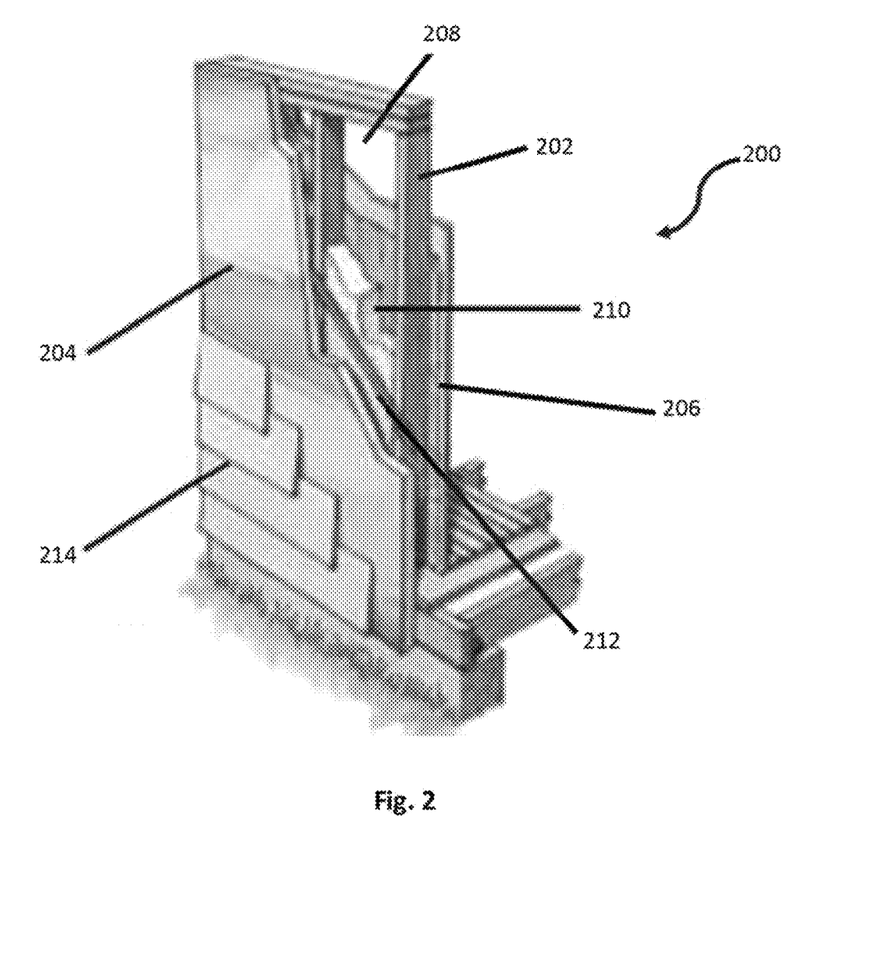
FIG. 2 illustrates an embodiment of a commercial or residential wall system or structure that includes a spray foam insulation positioned inside a wall cavity.

Referring now to FIG. 2, illustrated is an embodiment of a wall system or structure 200 that may be used to insulate a commercial or residential structure. In some embodiments, wall system 200 may be substantially free of non-reactive halogen fire retardants, wherein each or most of the wall system components is free of a non-reactive halogen fire retardant. Wall system 200 includes a plurality of structural support members or wall studs 202 that are coupled together to form a wall frame. A plurality of foam boards, particle boards and/or plywood boards 204 (hereinafter sheathing boards 204) are attached to an exterior side of the frame to form an insulative exterior wall or surface of the wall system 200 (i.e., continuous external sheathing insulation). A plurality of wall boards 206 are attached to an interior side of the frame opposite the sheathing boards 204 to form an interior wall or surface of the wall system 200. In some embodiments, the wall boards 206 are free of non-reactive halogenated fire retardant. Exemplary wall boards 206 include gypsum boards and the like. The wall studs 202, sheathing boards 204, and wall boards 206 define a plurality of wall cavities 208.

Fasteners (not shown) are used to attach the sheathing boards 204 and wall boards 206 to the respective sides of the frame. Each fastener may include an elongate shaft that penetrates through a respective board and into a wall stud 202 to couple the components together. Exemplary fasteners include nails and screws, although in some embodiments non-mechanical fasteners may be used, such as adhesives and the like. Spray foam insulation 210 is positioned within at least one of the wall cavities 208 of the wall system, and more commonly within each wall cavity 208 or within most of the wall cavities. The spray foam insulation 210 is positioned within the wall cavity 208 to insulate the building or structure.

In some embodiments, an additional wall board 212 may be attached to the exterior side of the frame. In some embodiments, the additional wall board 212 may be free of a non-reactive halogenated fire retardant. The additional wall board 212 may be a gypsum board, cement board, oriented strand board (OSB), plywood, and the like. Wall board 212 may be positioned between the sheathing board 202 and frame or wall studs 202 for structural support and/or other purposes. External veneer or cladding 214 (hereinafter exterior cladding 214) may be positioned on an exterior side of the sheathing boards 204. In some embodiments, the exterior cladding 214 may be free of a non-reactive halogenated fire retardant. The exterior cladding 214 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 214 and the sheathing boards 204. The wall system 200 may also include other components, layers, and/or materials that are not shown, such as an interior vapor barrier, flashing, primer, and the like.

Further, the sheathing board 204 of wall system 200 may be produced from a non-halogenated fire retardant. In some embodiments, the sheathing board 204 may also include a foil facer that is attached to an exterior side of the board. The sheathing boards 204 may comprise foam and have a foam density of between about 1.5 and 2.5 pcf, and more commonly between about 1.6 and 2.0 pcf. In some embodiments, the sheathing board also includes between 1 and 10 weight percent of a blowing agent, such as a hydrocarbon blowing agent. In other embodiments, the sheathing board includes between about 5 and 8 weight percent of the blowing agent.

Figure 3:
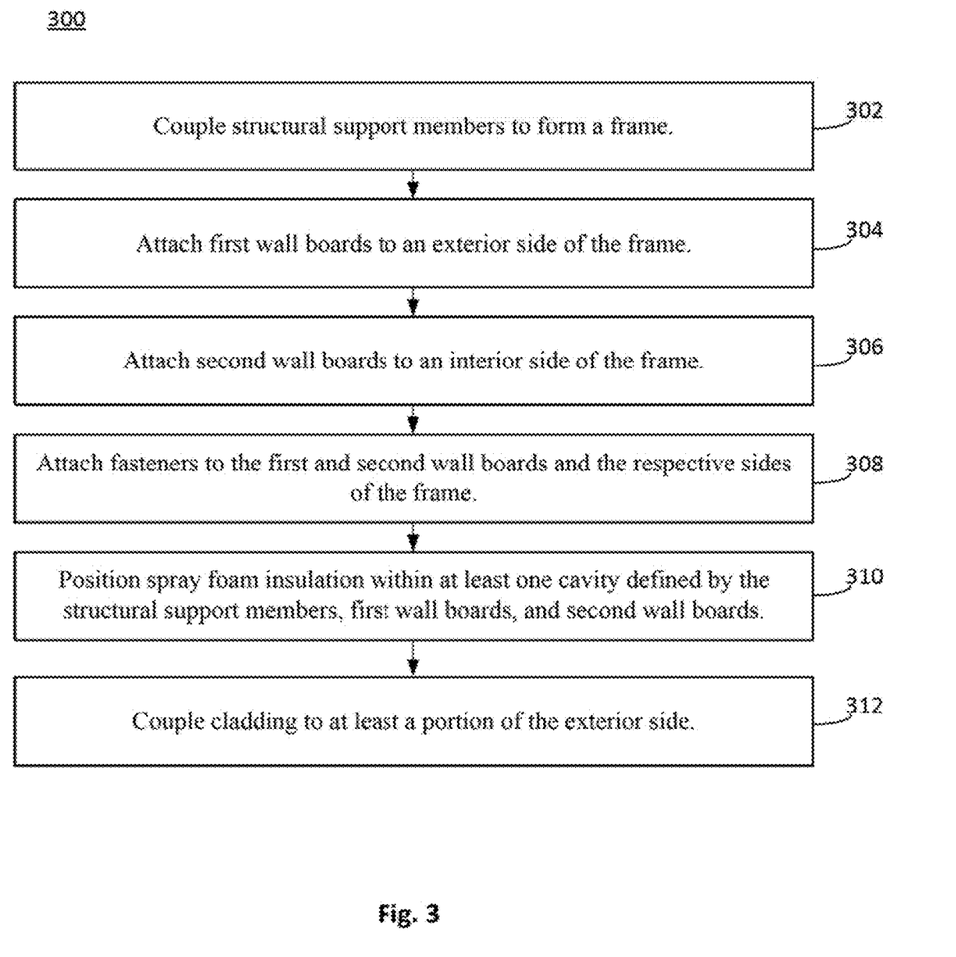
FIG. 3 illustrates a method for insulating a component of a building with the present spray foam insulation.

Turning now to FIG. 3, an insulation method 300 for insulating a component of a building with spray foam insulation is provided. The method 300 may include coupling 302 a plurality of structural support members together to form a frame. The structural support members may include wall studs as shown in FIG. 2. The method 300 may further include the step of attaching 304 a plurality of first wall boards, such as foam boards or sheathing boards, to an exterior side of the frame to form an exterior wall or surface of the structure. Further, the method 300 may include attaching 306 a plurality of second wall boards to an interior side of the frame to form an interior wall or surface of the structure. In this way, the method 300 provides for a plurality of wall cavities defined by the structural support members, the first wall boards, and the second wall boards. In some embodiments, the method further includes the step of attaching 308 a plurality of fasteners to the first and second wall boards and the respective sides of the frame to secure the building structure. As described previously, each fastener may comprise an elongate shaft that penetrates through a respective wall board and into a respective structural support member to couple the components together. Such fasteners may include nails and screws, non-mechanical fasteners, adhesives, and the like.

Still referring to FIG. 3, the method 300 further includes the step of positioning spray foam insulation within at least one of the wall cavities of the structure to insulate an interior space of the structure 310. The spray foam insulation is made from the present spray PUR and/or PIR spray foam formulations described above. Exemplary methods of positioning the spray foam insulation may include spraying the A-side and B-side components of the formulation into the wall cavity with the aid of a blowing agent. In the case of an open-cell spray foam insulation, the blowing agent may be water or an aqueous solution. In the case of a closed-cell spray foam insulation, the blowing agent may be a fluorocarbon gas (e.g., 245-fa, 365-mfc, HFO 1233zd) and/or a non-halogenated hydrocarbon (e.g., pentane).

In another aspect, the method 300 further includes the steps of coupling 312 cladding to at least a portion of the exterior wall. Fiberglass material may also be optionally positioned within at least one of the wall cavities.

EXPERIMENTAL

A polyurethane spray foam formulation that includes a non-halogenated phosphorus-containing fire retardant compound (DEHMP) is described below in Table 7.

TABLE 7

| Polyurethane Spray Foam Formulation with No Halogenated Compounds | |
|---|---|
| B-side Chemical | Weight % |
| Polyol | 0-35 |
| Metal Catalysts | 0-1 |
| Amine Catalyst | 5-11 |
| DEHMP | 5-20 |
| Water | 15-25 |
| Sugar | 15-40 |
| A-side Chemical | % |
| Rubinate M (polymeric MDI) | 100 |

Figure 4:
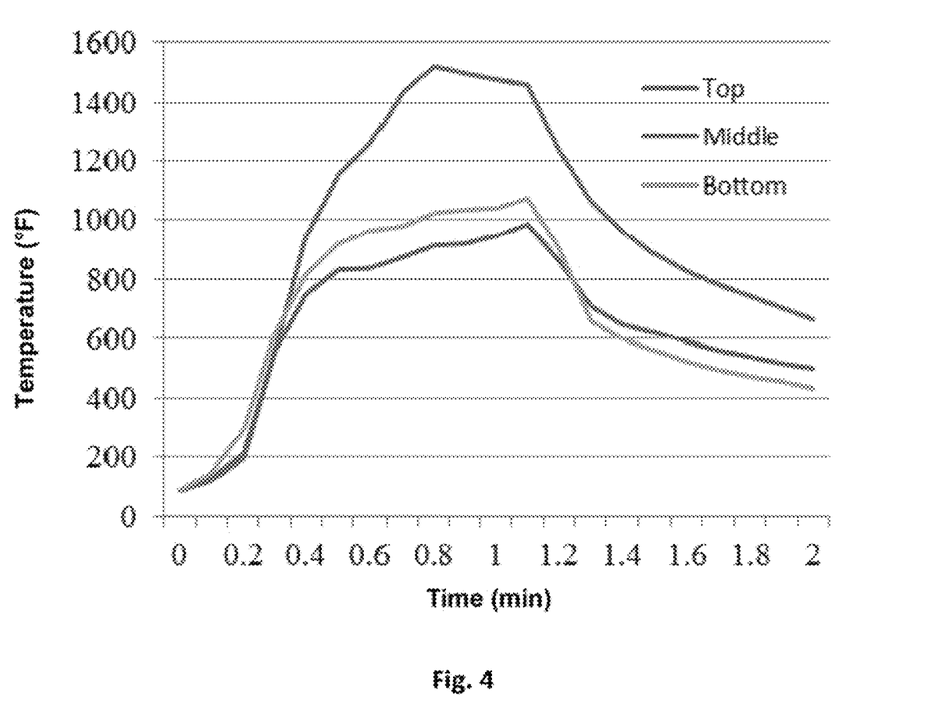
FIG. 4 is a graph of a temperature profile for the top, middle, and bottom sections of a cavity wall filled with a spray foam that uses a halogen-containing fire retardant.
Figure 5:
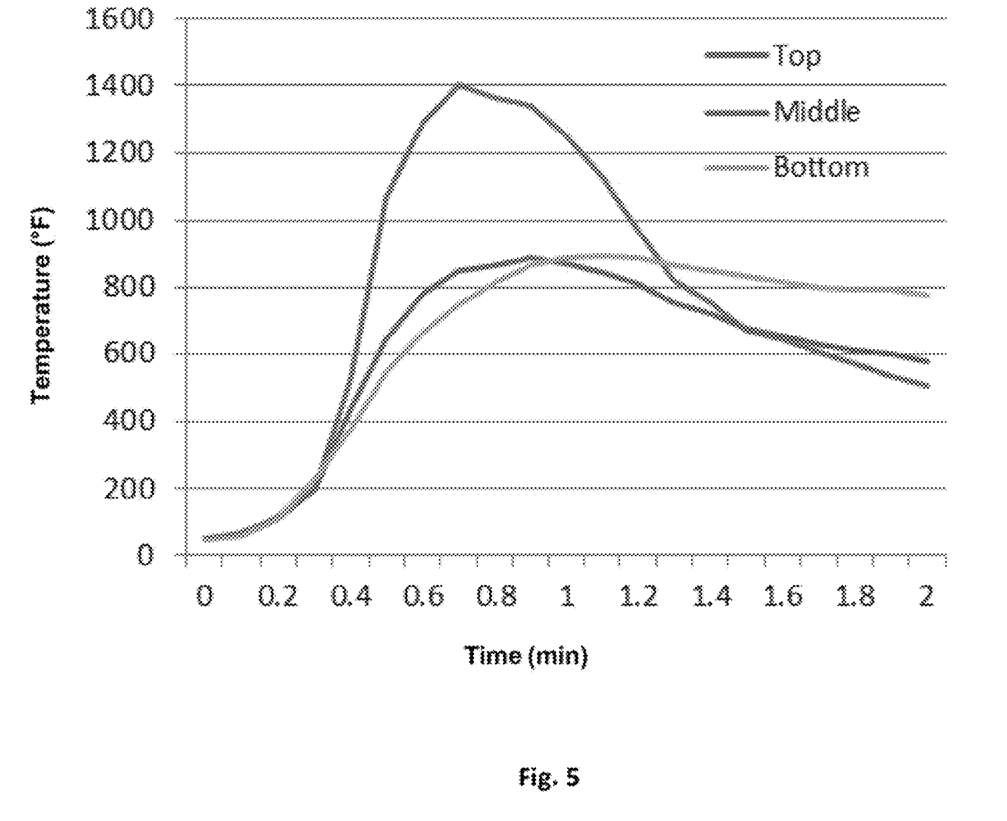
FIG. 5 is a graph of a temperature profile for the top, middle, and bottom sections of a cavity wall filled with a spray foam that uses a reactive halogenated and/or non-halogen-containing fire retardant.

FIGS. 4 and 5 show graphs of temperature profiles the top, middle, and bottom sections of a cavity wall filled with spray foam during a flame test. FIG. 4 is the graph of the temperature profile for a control polyurethane spray foam made with a non-reactive halogenated fire retardant. FIG. 5 is the graph of the temperature profile for an exemplary polyurethane spray foam made with a non-halogenated fire retardant, such as the ones described in Table 3 above. As seen in FIG. 5, the less rapid rise in temperature (and lower temperature plateau) of the exemplary spray foam in the middle and bottom sections of the cavity wall demonstrate the spray foam is less flammable in these sections than the control spray foam whose profile is shown in FIG. 4. Thus, exemplary formulations of the present spray foams which do not include a non-reactive halogenated fire retardant show fire retardant properties that are superior to spray foams made with conventional, non-reactive halogen-containing fire retardants.

Additional measurements were taken on reactive-halogenated and non-halogenated, open cell polyurethane spray foams, as well as a control spray foam that included both a non-reactive halogenated fire retardant as well as a reactive halogenated fire retardant. The measurements included the density (in pounds per cubic foot) and percent weight retention of the spray foams after being exposed to a controlled open flame source.

Test samples 1-6 listed in Table 8 below included a control spray foam (Sample 1) that had both a non-reactive halogenated fire retardant (i.e., TCPP) as well as a reactive-halogenated fire retardant. Five more spray foams (Samples 2-6) were measured that contained non-halogenated fire retardants. Finally, the measurements were also taken on a commercial spray foam ("Comm"). This sample is referred to as commercial ("Comm") in Table 8:

TABLE 8

Density and Percent Weight Retention Measurements on Open Cell SPF Formulations

| Component | 1 | 2 | 3 | 4 | 5 | 6 | Comm |
|---|---|---|---|---|---|---|---|
| Polyether Polyol | 0 | 0 | 0 | 4 | 0 | 0 | — |
| Aliphatic Polyamine | 0 | 0 | 1-3 | 0.5-2 | 1-3 | 0.5-2 | — |
| Sucrose | 26-30 | 0 | 0 | 0 | 20-24 | 28-32 | — |
| Water | 18-22 | 20-24 | 20-26 | 23 | 20-24 | 20-24 | — |
| Reactive Halogenated Fire Retardant | 4-8 | 0 | 0 | 0 | 0 | 0 | — |
| Ammonium Polyphosphate | 0 | 0 | 30-40 | 30-36 | 12-18 | 0 | — |
| Non-reactive Organophosphate | 0 | 50-54 | 0 | 0 | 0 | 12-18 | — |
| TEP | 0 | 0 | 10-14 | 12 | 12-16 | 0 | — |
| DEHMP | 0 | 0 | 0 | 0 | 0 | 8-12 | — |
| TCPP | 24-27 | 0 | 0 | 0 | 0 | 0 | — |
| Amine Catalysts | 8-12 | 8-12 | 8-12 | 8-12 | 8-12 | 8-12 | — |
| Silicone Surfactant | 0.5-2 | 0.5-2 | 0.5-2 | 0.5-2 | 0.5-2 | 0.5-2 | — |
| NP-9 | 8-12 | 10-20 | 14-18 | 14-18 | 12-16 | 8-12 | — |
| Density (pcf) | 0.55 | 0.68 | 0.57 | 0.50 | 0.58 | 0.49 | 0.64 |
| Percent Weight Retention | 78.1 | 70.1 | 79.8 | 85.1 | 85.3 | 75.3 | 50 |

Sample 1 and the commercially available spray foam labeled as "Comm" both passed the Appendix X fire test. Because the percent weight retention measurement can be used as a proxy for passing the Appendix X test, and because the five Samples 2-6 all have percent weight retentions within the range of the two spray foams confirmed to have passed the Appendix X fire test, all five samples are predicted to pass the Appendix X test. The samples are predicted to pass the fire test despite lacking a non-reactive halogenated fire retardant.

The description above provides exemplary embodiments, and is not intended to limit the scope, applicability or configuration of the disclosure. Rather, the description of the exemplary embodiments provides those skilled in the art with an enabling description for implementing one or more exemplary embodiments. It is understood that various changes may be made in the function and arrangement of elements without departing from the spirit and scope of the invention as set forth in the appended claims. For example, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The description and/or claims herein may use relative terms in describing features and/or aspects of the embodiments. For example, the description and/or claims may use terms such as relatively, about, substantially, approximately, and the like. These relative terms are meant to account for deviations that may be appreciated or accepted in the art. For example, the description and/or claims may describe the wall or roof system being substantially free of halogen. Such a description implies that each or most of the wall system components is free of a halogen fire retardant while recognizing that some of the components may include a very small and/or negligible amount of halogen. Likewise, the disclosure herein may describe the components of the wall or roof system being substantially continuous. Such a description implies that the components may be assembly and/or attached so that a layer of the component or material is essentially continuous while recognizing that some interruptions from a fully continuous surface or layer, or other minor irregularities, may be present. The relative terms used herein may account for deviations from uniform that may appreciated and/or accepted by those skilled in the art. These deviations may be up to about 10%, but are typically less than 5% and often less than about 3%.

What is claimed is:

1. A spray foam formulation used in an insulation layer in a wall structure, the spray foam formulation comprising:
    a reaction product of a polyisocyanate compound and a polyol compound, wherein the polyol compound comprises at least one of a polyester polyol, a polyether polyol, or a Manich polyol;
    a fire retardant comprising a reactive halogen-containing fire retardant;
    10 wt. % to 26 wt. % water based on a total weight of the spray foam formulation; and
    an unreacted carbohydrate,
    wherein the insulation layer has an insulative R value of 3.0 to 7.2 per inch, and a density of between about 0.3 to about 4.5 pcf, and
    wherein the insulation layer exhibits an Appendix X modified NFPA 286 standard and an ASTM E-84 performance equivalent with or better than an identical insulation layer except for having a non-reactive halogenated fire retardant tris(1-chloro-2-propyl)phosphate (TCPP).

2. The spray foam formulation of claim 1, wherein the insulation layer is an open cell insulation layer having a density between about 0.3-0.7 pcf.

3. The spray foam formulation of claim 1, wherein the insulation layer is a closed cell insulation layer having a density between about 2.0-4.0 pcf.

4. The spray foam formulation of claim 1, wherein the spray-foam formulation further comprises a non-halogenated fire retardant.

5. The spray foam formulation of claim 4, wherein the non-halogenated fire retardant comprises at least one of an organo-phosphate compound or diethyl hydroxymethylphosphonate.

6. The spray foam formulation of claim 5, wherein the at least one organo-phosphate compound is triethyl phosphate (TEP).

7. The spray foam formulation of claim 5, wherein the at least one organo-phosphate compound is a blend of butyl diphenyl phosphate, dibutyl phenyl phosphate, and triphenyl phosphate.

8. The spray foam formulation of claim 1, wherein the unreacted carbohydrate is chosen from sucrose and high-fructose corn syrup.

9. An insulation layer formed with a spray foam formulation comprising:
    a reaction product of a polyisocyanate compound and a polyol compound, wherein the polyol compound comprises at least one of a polyester polyol, a polyether polyol, or a Manich polyol;
    a fire retardant comprising a reactive halogen-containing fire retardant;
    an unreacted carbohydrate; and
    10 wt. % to 26 wt. % water based on a total weight of the spray foam formulation.

10. The insulation layer of claim 9, wherein the insulation layer has an insulative R value of 3.0 to 7.2 per inch.

11. The insulation layer of claim 9, wherein the insulation layer has a density ranging from 0.3 to 4.5 pounds per cubic feet.

12. The insulation layer of claim 9, wherein the insulation layer exhibits an Appendix X modified NFPA 286 standard performance that is the same or better than a spray insulation layer comprising (i) a reaction product of a polyisocyanate compound and a polyol compound, (ii) a carbohydrate, (iii) water, and (iv) a fire retardant that includes tris(1-chloro-2-propyl)phosphate (TCPP).

13. The insulation layer of claim 9, wherein the insulation layer exhibits an ASTM E-84 performance that is the same or better than a spray insulation layer comprising (i) a reaction product of a polyisocyanate compound and a polyol compound, (ii) a carbohydrate, (iii) water, and (iv) a fire retardant that includes tris(1-chloro-2-propyl)phosphate (TCPP).

14. The insulation layer of claim 9, wherein the spray-foam formulation further comprises a non-halogenated fire retardant.

15. The insulation layer of claim 14, wherein the non-halogenated fire retardant comprises triethyl phosphate (TEP).

16. The insulation layer of claim 14, wherein the non-halogenated fire retardant includes (i) a reactive fire retardant and (ii) a non-reactive fire retardant, and further wherein a ratio of the reactive fire retardant to the non-reactive fire retardant is greater than or equal to 1.

17. The insulation layer of claim 9, wherein the unreacted carbohydrate includes at least one sugar selected from the group consisting of sucrose and high-fructose corn syrup.

18. An insulation layer formed with a spray foam formulation comprising:
    a reaction product of a polyisocyanate compound and a polyol compound, wherein the polyol compound comprises at least one of a polyester polyol, a polyether polyol, or a Manich polyol;
    10 wt. % to 25 wt. % of at least one fire retardant selected from the group consisting of a non-halogenated fire retardant, and a reactive halogen-containing fire retardant;
    20 wt. % to 50 wt. % of an unreacted carbohydrate; and
    10 wt. % to 26 wt. % water based on a total weight of the spray foam formulation.

19. The insulation layer of claim 18, wherein the at least one fire retardant comprises diethyl hydroxymethylphosphonate.

20. The insulation layer of claim 19, wherein the at least one fire retardant further comprises triethyl phosphate (TEP).

21. The insulation layer of claim 18, wherein the unreacted carbohydrate comprises high-fructose corn syrup.

22. The insulation layer of claim 18, wherein the insulation layer exhibits an Appendix X modified NFPA 286 standard performance that is the same or better than a spray insulation layer comprising (i) a reaction product of a polyisocyanate compound and a polyol compound, (ii) a carbohydrate, (iii) water, and (iv) a fire retardant that includes tris(1-chloro-2-propyl)phosphate (TCPP).

23. The insulation layer of claim 18, wherein the insulation layer exhibits an ASTM E-84 performance that is the same or better than a spray insulation layer comprising (i) a reaction product of a polyisocyanate compound and a polyol compound, (ii) a carbohydrate, (iii) water, and (iv) a fire retardant that includes tris(1-chloro-2-propyl)phosphate (TCPP).

* * * * *